(12) United States Patent
Shiraishi

(10) Patent No.: US 7,337,706 B2
(45) Date of Patent: Mar. 4, 2008

(54) FULL AUTOMATIC RICE COOKING APPARATUS

(75) Inventor: Masami Shiraishi, Kyoto (JP)

(73) Assignee: Nippo Co., Ltd., Kyoto-shi (JP)

( * ) Notice: Subject to any disclaimer, the term of this patent is extended or adjusted under 35 U.S.C. 154(b) by 0 days.

(21) Appl. No.: 10/526,562

(22) PCT Filed: Sep. 10, 2003

(86) PCT No.: PCT/JP03/11598

§ 371 (c)(1),
(2), (4) Date: Mar. 4, 2005

(87) PCT Pub. No.: WO2004/023946

PCT Pub. Date: Mar. 25, 2004

(65) Prior Publication Data

US 2006/0032381 A1    Feb. 16, 2006

(30) Foreign Application Priority Data

Sep. 11, 2002    (JP) .............................. 2002-264971

(51) Int. Cl.
*A47J 27/00*    (2006.01)

(52) U.S. Cl. ............................ 99/326; 99/330; 99/355; 99/403

(58) Field of Classification Search .......... 99/326–331, 99/352–355, 451, 483–485, 468, 516, 534–536, 99/403–418, 519–524
See application file for complete search history.

(56) References Cited

U.S. PATENT DOCUMENTS 5,113,881 A *  5/1992  Lin et al. ....................... 134/1
5,156,082 A * 10/1992  Fukuda et al. ................ 99/326
5,498,431 A *  3/1996  Lindner ....................... 426/238
5,595,105 A *  1/1997  Kang .......................... 99/327
6,752,072 B2* 6/2004  Yamamoto et al. ........... 99/519
6,827,008 B2* 12/2004 Imura .......................... 99/519

(Continued)

FOREIGN PATENT DOCUMENTS

CN          87 2 14040 U     10/1988

(Continued)

*Primary Examiner*—Timothy F. Simone
(74) *Attorney, Agent, or Firm*—Oliff & Berridge, PLC

(57) ABSTRACT

The present invention is made for the purpose of providing a full automatic rice cooking apparatus that can automatically carry out all of the steps from rice measuring to rice boiling and further washing of a rice kettle after use. This purpose is achieved by an automatic rice cooking apparatus, where a rice supplier supplies a predetermined amount of rice into a rice kettle, a rice rinsing means may rinse the rice, and then a rice boiling means boils the rice while placing the rice kettle at a predetermined position. The apparatus includes a rice kettle washing means for washing an inner wall of the rice kettle 32 placed at the predetermined position after the rice boiling and a controller for controlling the rice supplier, the rice rinsing means, the rice boiling means and the rice kettle washing means. By automatically performing the washing of the rice kettle after use in addition to the rice measuring, the rice rinsing and the rice boiling in a single apparatus, a significant laborsaving in the rice cooking can be produced. Further, it is possible to lower the cost and reduce the size.

11 Claims, 3 Drawing Sheets

U.S. PATENT DOCUMENTS 6,886,453 B2 * 5/2005 Yamamoto et al. ........... 99/519

FOREIGN PATENT DOCUMENTS

| CN | 2304349 Y | 1/1999 |
| --- | --- | --- |
| JP | A-02-029216 | 1/1990 |
| JP | A-02-305521 | 12/1990 |
| JP | U-06-045486 | 2/1994 |
| JP | B2-07-4320 | 1/1995 |
| JP | A-07-231847 | 9/1995 |
| JP | A-08-056839 | 3/1996 |
| JP | 10-24239 * | 1/1998 |
| JP | Y2-2582377 | 7/1998 |
| JP | A-2000-201818 | 7/2000 |
| JP | A-2002-291616 | 10/2002 |

* cited by examiner

FULL AUTOMATIC RICE COOKING APPARATUS

TECHNICAL FIELD

The present invention relates to an automatic rice cooking apparatus that can cook rice with no need of manual work.

BACKGROUND ART

As a rice cooking apparatus that automatically carries out a series of steps from rice measuring to rinsing and further boiling of rice, various types have been proposed so far. None of such apparatuses is provided with a means for washing a rice kettle after bringing out boiled rice. Therefore it is necessary to manually wash a rice kettle, which is laborious.

In the Japanese Unexamined Patent Publication No. H7-231847 is proposed an automatic washing device for a rice cooker that automatically washes a rice kettle. This publication discloses an automatic rice cooking system with an assembly line from rice measuring to rice boiling and further rice kettle washing, where the washing device is used in combination with a rice rinsing device, a rice boiling device, etc. This automatic rice cooking system is intended for use in large-sized facilities including a school lunch center and also requires an individual device to be provided in each step. Thus, the automatic rice cooking system is not suitable for use in a house, a small-sized shop, a small-scale facility, etc. due to its large space and high expenditure for installation.

In view of the above problems, an object of the present invention is to provide a low-cost and small-sized full automatic rice cooking apparatus that automatically performs washing of a rice kettle after use in addition to measuring, rinsing and boiling of rice in a single apparatus, so that it can produce a significant laborsaving in the rice cooking.

DISCLOSURE OF THE INVENTION

The present invention provides an automatic rice cooking apparatus carrying out a series of steps while placing a rice kettle at a predetermined position, provided with a water supplier for supplying water into the rice kettle and a discharger for discharging water supplied into the rice kettle and/or others to the outside, where a rice supplier supplies a predetermined amount of rice into the rice kettle and then a rice boiling means boils the rice, characterized in that the apparatus comprises a rice kettle washing means for washing an inner wall of the rice kettle placed at the predetermined position after the rice boiling and a controller for controlling the water supplier, the discharger, the rice supplier, the rice boiling means and the rice kettle washing means.

In the case of using rinsing-free rice (or "Musenmai"), any means other than those above is not necessary. But the above rice cooking apparatus may further include a rice rinsing means so as to also use normal rice. Here, it is preferable that the controller can predetermine whether to carry out the rinsing step and a non-rinsing mode is selectable particularly in using the Musenmai.

Preferably, the rice supplier includes a rice container for storing rice and a measuring unit for measuring rice supplied from the rice container and further supplying the rice into the rice kettle, which can save the labor of measuring rice and putting it into the rice kettle in every rice cooking.

The water supplier is intended for supplying water into the rice kettle when in the boiling, the washing and, if necessary, the rinsing. On the other hand, the discharger is intended for discharging the water and/or other substances from the rice kettle after carrying out those steps.

Preferably, the water supplier includes a water meter for measuring a preset amount of water and a feed-water unit for feeding the water measured by the water meter into the rice kettle. The water supplier may be provided separately for the rinsing and the washing or constructed to be in common use for both of them.

Preferably, the discharger includes a suction pipe vertically movable to the lower limit level slightly above an inner bottom surface of the rice kettle, a suction pipe driver for vertically moving the suction pipe and a pump for sucking up water within the rice kettle, possibly containing leftover rice, through the suction pipe.

When in rinsing rice, the above suction pipe is set at the lower limit position where its tip is located slightly above the inner bottom surface of the rice kettle so as not to suck up the rice as well as the water. The tip of the suction pipe is spaced apart from the inner bottom surface of the rice kettle at such a distance that prevents entry of the rice. When in washing the rice kettle, provision is preferably made as follows. The tip of the suction pipe is first located above the lower limit position so as to easily suck up water containing leftover rice, and then lowered gradually. At the stage of draining all the water within the rice kettle after completion of the final washing, the tip of the suction pipe is lowered to the above lower limit position, so that the remaining water is minimized.

For the rice kettle washing means, any kind of means can be adopted if it is electrically controllable, such as a means including an electric brush etc. that moves along an inner wall of the rice kettle or a means for separating leftover rice attached to the rice kettle by slightly giving ultrasonic vibration to the water and leftover rice within the rice kettle.

The rice rinsing means and the rice kettle washing means may be different from each other. However, in the case of using ultrasonic waves for the washing means, the washing means can be constructed to serve as the rinsing means. With such a construction, bran and/or dirt can be removed from the surface of the rice by slightly giving ultrasonic vibration to the water and rice within the rice kettle when in rinsing rice. Owing to the above construction, it is possible to reduce the number of parts, lower the manufacturing costs and downsize the apparatus.

In the case of performing the ultrasonic washing, it is preferable to adopt such a construction where the ultrasonic waves are generated by a plurality of ultrasonic transducers equally arranged around the periphery of the rice kettle. This allows the ultrasonic waves to be transmitted equally to the water and rice within the rice kettle. Therefore, a high washing effect can be obtained.

In accordance with the present invention, the full automatic rice cooking apparatus includes the controller for controlling the rice supplier, the rice boiling means, the rice kettle washing means, the water supplier, the discharger and, if necessary, the rice rinsing means. The controller performs each control of those means, which makes it possible to automatically carry out the respective steps of the rice supply, the rinsing, the boiling and the washing as well as to automatically switch between those steps, with no need of manual work. Preferably, the controller can predetermine whether to carry out the rinsing step and a non-rinsing mode is selectable particularly in using the Musenmai, as described above. More preferably, a finish time of the boiling step and the amount of boiled rice is set up so that it automatically leads to setting the amount of rice and water corresponding to the above settings as well as the time required for the respective steps of measuring, rinsing, soaking, heating and steaming of rice.

It is preferable that the boiling means, composed of a rice cooker main body with a heater, a rice kettle and a lid, is movable horizontally. The rice cooker main body movable horizontally makes it easy to bring out boiled rice and the lid movable horizontally makes it easy to perform the respective operations of the rice supply as well as the water supply and the water discharge.

BEST MODE FOR CARRYING OUT THE INVENTION

Figure 1:
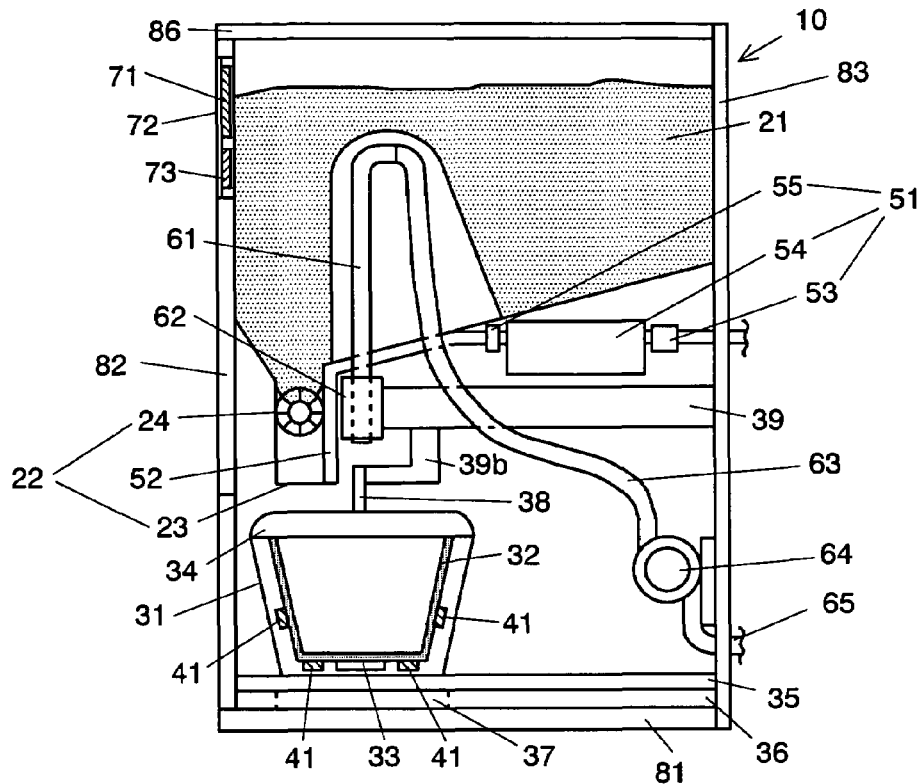
FIG. 1 is a sectional side view of a full automatic rice cooking apparatus embodying the present invention.
Figure 2:
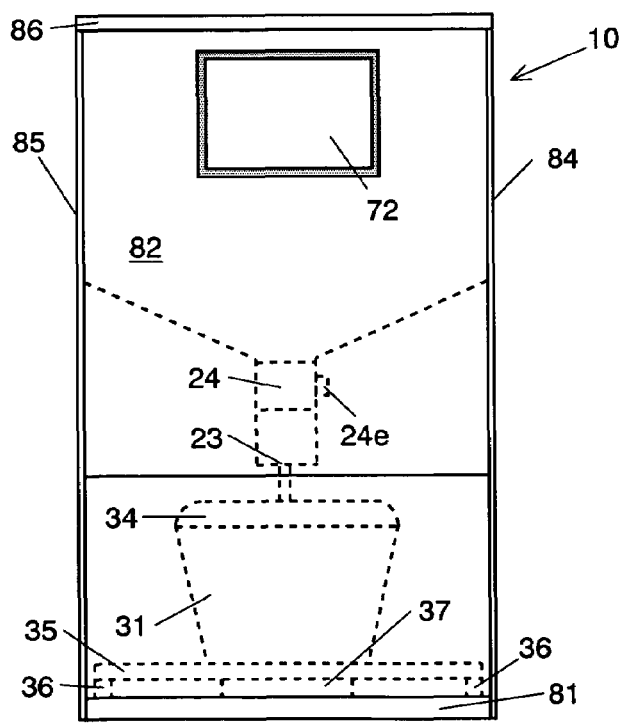
FIG. 2 is a front view of the embodiment.

The best embodiment of the present invention is described below, referring to the drawings. In the following description, the left hand of FIG. 1 is defined as a front side and the right hand of FIG. 1 is defined as a backside.

A full automatic rice cooking apparatus 10 of the present embodiment includes a rice supplier 20, a rice boiling means 30, a ultrasonic generator 40, a water supplier 50, a discharger 60, a controller 70 and a casing, performing the rice rinsing and the rice kettle washing by means of ultrasonic waves.

The above casing is composed of a bottom panel 81, a front panel 82, a back panel 83, a right side panel 84, a left side panel 85 and a top panel 86, having an opening for taking a rice cooker main body out of the casing on the lower part of a foreface of the casing.

The top panel 86, serving as a lid covering the rice container, needs to be removed when in supplying rice into the rice container. Therefore, the top panel is attached so that it can open and close.

The rice boiling means 30 includes a rice cooker main body 31, a rice kettle 32, a heater 33, a lid 34, a slide table 35, a rice cooker slide rail 36, a slide table driver 37, an extension shaft 38, a lid slide rail 39 and a slide arm 39b. The rice cooker main body 31 encloses the rice kettle 32 with no space between. The heater 33 for heating the rice kettle at the time of boiling rice is provided at the bottom of the rice cooker. The rice cooker slide rail 36 is provided on the bottom panel 81 of the above casing. The slide table 35 is slidably mounted on the rice cooker slide rail 36 so that it can move back and forth in a horizontal direction with the rice cooker main body 31 mounted thereon. The extension shaft 38, fixed to the center of the upper face of the lid 34, is slidably connected to the lid slide rail 39 via the slide arm 39b. The extension shaft 38 is intended for vertically moving the lid 34 and the lid slide rail 39 is intended for moving the lid 34 back and forth in a horizontal direction.

The ultrasonic generator 40, provided with a plurality of ultrasonic transducers 41 and an inverter (not shown), is constructed so that the inverter controlled by the controller 70 gives high-frequency power to the ultrasonic transducers 41. The ultrasonic transducers 41 are equally arranged in the rice cooker main body 31 and attached so that its surface for the ultrasonic generation contacts the rice kettle 32.

Figure 3:
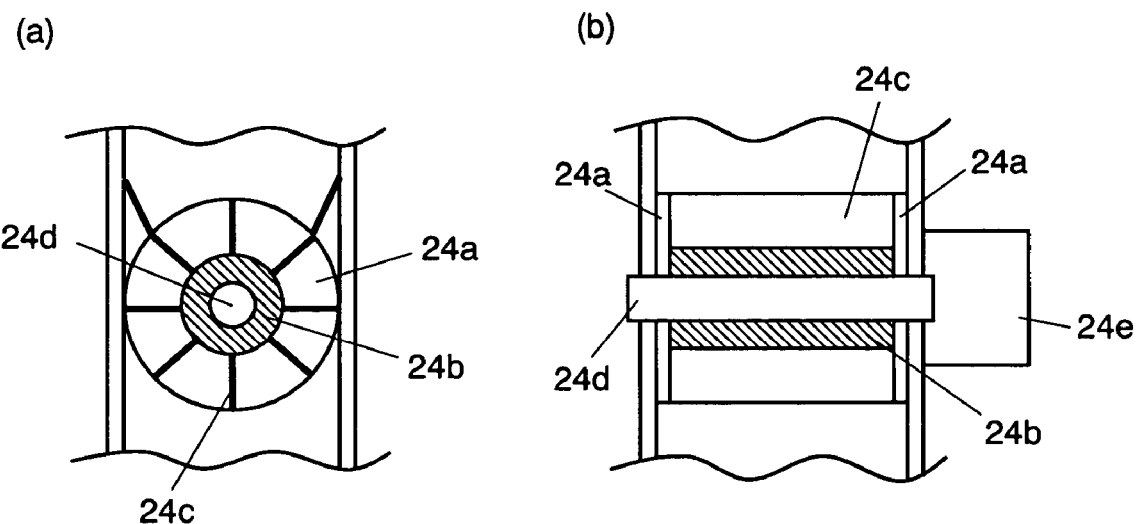
FIG. 3 is an enlarged view of the measuring unit according to the embodiment, where (a) is a sectional side view and (b) is a sectional front view.

The rice supplier 20 includes the rice container 21 and the measuring unit 22. The rice container 21 is located above the rice cooker main body 31. The container has a bottom surface formed in a tapered shape, so that the rice naturally gathers into a cylindrical rice supply port 23 formed integrally with the rice container 21. The measuring unit 22 includes the rice supply port 23 and a measuring drum 24 provided inside the rice supply port 23. FIG. 3 shows the measuring drum 24, shaped like a waterwheel. The measuring drum 24 has such a construction where the central parts of two disks 24a are connected to each other by a hollow bearing 24b and a space between the two disks 24a is divided by eight vanes 24c with the circumferential surface open. Each of the two disk 24a has a hole in its center, positioned corresponding to the hollow part of the bearing 24b. A shaft 24d is inserted into the hole and the hollow part of the bearing 24b. The above-constructed measuring drum 24, rotatable around the shaft 24d, is attached to the inside of the rice supply port 23. Thus, a specific amount of rice enters the spaces between the vanes 24c and the two disks 24a, and then is discharged from the rice supply port 23 to the outside by rotation of the measuring drum 24. An end of the shaft 24d is connected to a rotation shaft (not shown) of a motor 24e. Therefore, the amount of rice discharged from the rice supply port 23 can be adjusted through rotation control of the motor 24e by the controller 70.

The water supplier 50, located below the rice container 21, includes a water meter 51 and a feed-water unit 52. The water supplier 50 is constructed to supply water into the rice kettle 32 through the feed-water unit 52, controlling the water supply by the water meter 51. The water meter 51 is composed of a decompression valve 53 for adjusting the pressure of water supplied from the outside, a tank 54 for temporarily reserving the water and an electromagnetic valve 55 for controlling the water supply from the tank 54 to the feed-water unit 52. It is possible to control the water supply to the feed-water unit 52 by adjusting the open/close time of the electromagnetic valve 55. The feed-water unit 52, as a tubular structure to feed water from the water meter 51 to the rice kettle 32, slopes downward so as to cause the smooth flow of water. The tip of the feed-water unit 52 is located almost above the center of the rice kettle 32, so that the water is assuredly fed from the feed-water unit 52 into the rice kettle 32.

The discharger 60 is composed of a suction pipe 61, a suction pipe driver 62, a hose 63, a pump 64 and a drain pipe 65. The suction pipe 61 is arranged so that a suction port 66 at the lower end is substantially in the center of the rice kettle 32 from a top-view point and is attached so as to be vertically movable by the suction pipe driver 62 provided at the front part of the lid slide rail 39. The suction pipe 61 is held above the rice cooker main body 31 when not in use. When in use, the suction pipe 61 can be lowered to the inside of the rice kettle 32. An upper end of the suction pipe 61 is connected to the hose 63 and the other end of the hose 63 is connected to the suction side of the pump 64 provided at the lower part of the inside of the back panel 83. The drain side of the pump 64 is connected to the drain pipe 65 passing through the back panel 83, which construction allows the waste water to be let out.

The controller 70 for controlling each of the above means is composed of a control unit 71, an operation panel 72 and a power unit. The control unit 71 includes a control circuit. The operation panel 72 is provided with a rice cooking switch, a rice kettle washing switch, a rice cooking unit shift switch and a stop switch. The rice cooking switch sends a cooking start signal to the control unit 71, the rice kettle washing switch sends a washing start signal to the control unit 71, the rice cooking unit shift switch sends the control unit 71 a signal for moving the slide table 35 back and forth, and the stop switch sends the control unit 71 a signal stopping the operation of the full automatic rice cooking apparatus 10. The control unit 71 receives the signals from the respective switches and then runs predetermined programs. Each of the above means thus carries out the rice cooking steps in series.

In the present embodiment, each part of the rice cooking apparatus includes a detector for detecting completion of the operation (not shown). When each part completes the operation, a signal indicating the completion is sent to the above control unit.

The rice cooking steps according to the present invention are described in the following.

At the time before the cooking is started, the rice cooking apparatus 10 of the present invention is in such a state where the rice cooker main body 31 is closed by the lid 34 and the suction pipe 61 remains resting up above, as shown in FIG. 1.

When the operator operates the rice cooking switch of the operation panel 72, the rice cooking apparatus 10 starts a series of functions for the cooking. First, the control unit 71 receives the cooking start signal and then sends a contraction signal to the extension shaft 38 fixed to the upper face of the lid 34. The extension shaft 38 contracts in response to the contraction signal, whereby the lid 34 moves upward. When the extension shaft 38 stops the contraction at a predetermined position, the slide arm 39b slides backward along the lid slide rail 39. Thus, the extension shaft 38 and the lid 34 fixed to the slide arm 39b moves backward. When the slide arm 39b stops at a predetermined position, the detector detects it and then sends the stop signal to the control unit 71. Receiving the stop signal, the control unit 71 sends a signal to the suction pipe driver 62, whereby the suction pipe driver 62 brings the suction pipe 61 down to the lower limit position. The lower limit position is preset so that the suction port 66 at the tip of the suction pipe is spaced apart from the inner bottom surface of the rice kettle 32 at such a distance that allows only the water to be sucked in while preventing the rice from entering the suction port 66.

Figure 4:
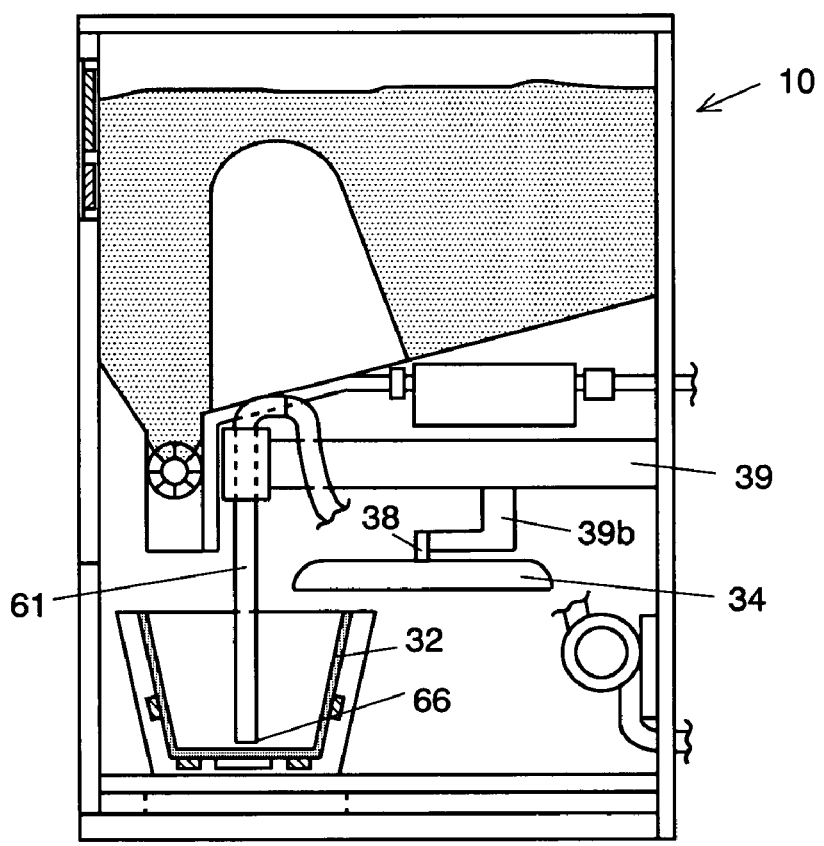
FIG. 4 is a sectional side view of the embodiment when discharging water.

The preparations for rinsing the rice are thus completed, and then the rice supplier 20 starts the supply operation in such a state as shown in FIG. 4. First, the control unit 71 sends a signal to the motor 24e performing rotation control of the measuring drum 24, so as to rotate the rotation drum a preset number of times. The measuring drum 24 is constructed so that a specific amount of rice enters the spaces delimited by the two disks 24a and the vanes 24c. By rotation of the measuring drum 24, the amount of rice dependent on the rotation numbers is discharged from the rice container 21 through the rice supply port 23 into the rice kettle 32. The rotation numbers of the measuring drum 24 can be controlled by the motor 24e. Therefore, the rotation control of the motor 24e enables a preset amount of rice to be measured. The preset amount of rice is supplied into the rice kettle 32 when the motor 24e of the measuring drum 24 is stopped. Then, the stop signal is sent to the control unit 71.

When the above rice supply operation is finished, subsequently, the water supplier 50 starts the supply operation. In response to a signal for opening the electromagnetic valve 55 sent by the controller 70, the electromagnetic valve 55 is opened and the water supplied from the outside of the rice cooking apparatus 10 is fed through the feed-water unit 52 into the rice kettle 32. The decompression valve 53 adjusts the pressure of the water, flowing from the outside into the rice cooking apparatus 10, to a constant level, so that the constant amount of water passes through the electromagnetic valve 55 in unit time. Thus, by adjusting the open time of the electromagnetic valve 55, it is possible to adjust the amount of water supplied into the rice kettle 32. When a preset period of time passes since the electromagnetic valve 55 is opened, the control unit 71 sends the electromagnetic valve 55 a close signal for the electromagnetic valve 55. Accordingly, the water supply to the rice kettle 32 is finished.

When the above water supply operation is finished, the ultrasonic generator 40 starts the rice rinsing operation. First, the control unit 71 sends a signal to the inverter for controlling the ultrasonic transducers 41, and the inverter gives high-frequency power to the ultrasonic transducers 41. The ultrasonic transducers 41 change the received high-frequency power into ultrasonic waves, so as to give ultrasonic vibration to the rice and water within the rice kettle 32 therethrough. Thereby, bran and/or dirt can be removed from the surface of the rice. When a preset period of time passes since the rinsing is started, a signal indicating the end of the rinsing is sent from the control unit 71. Accordingly, the rinsing by the ultrasonic transducers 41 is finished.

Receiving a signal indicating that the rinsing has been finished, the control unit 71 operates the pump 64. The water used for the rinsing is sucked up from the suction port 66 through the hose 63 and the pump 64 to the outside of the rice cooking apparatus 10. For adequately rinsing the rice, a series of the steps including the water supply, the ultrasonic rice rinsing and the water discharge are repeated a preset number of times.

When the final water discharge is completed after the rinsing operation is performed a preset number of times, the control unit 71 sends the suction pipe driver 62 a signal for raising the suction pipe 61. When the suction pipe 61 is raised and then stopped at a predetermined position, the control unit 71 lets the electromagnetic valve 55 be opened for a specific period of time. Thus, the amount of water required for the boiling is supplied into the rice kettle 32. Receiving a signal indicating that the water supply has been completed, the control unit 71 sends a signal for moving the slide arm 39b forward. Thus, the slide arm 39b as well as the extension shaft 38 and the lid 34 fixed to the slide arm 39 is moved forward and then stopped almost immediately above the rice cooker main body 31. After receiving a stop signal, the control unit 71 sends an extension signal to the extension shaft 38. By extension of the extension shaft 38, the lid 34 fixed to the lower end of the extension shaft 38 is lowered and then mounted on the rice cooker main body 31. Through the above process, the preparations for boiling the rice are completed.

Receiving a signal indicating that the lid 34 has been stopped, the control unit 71 sends the heater 33 a signal for the boiling. In advance of that, the rice is soaked for a specific period of time. When the boiling is finished, the control unit 71 sends the heater 33 a signal for the heat retention in response to a signal indicating that the boiling has been finished. When the rice cooker main body 31 comes into a heat retention mode, the rice cooking apparatus 10 of the present embodiment brings a series of steps for rice cooking to an end.

Figure 5:
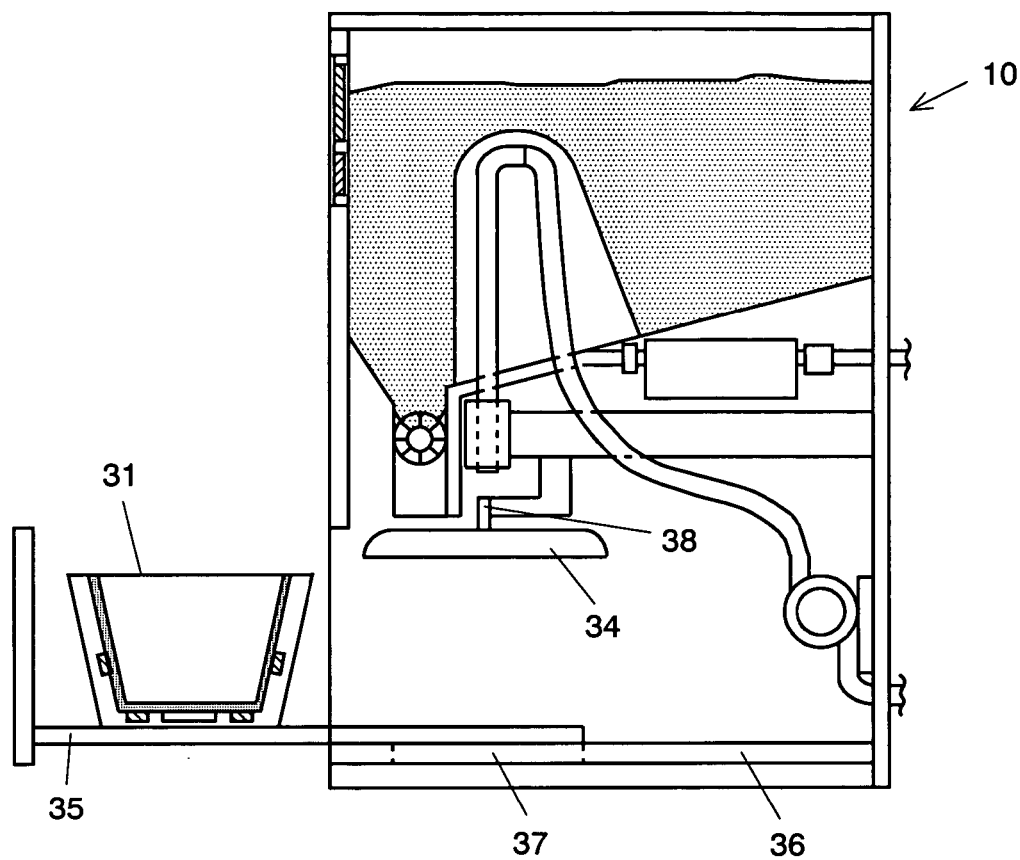
FIG. 5 is a sectional side view of the embodiment with the boiling means pulled out.
Figure 6:
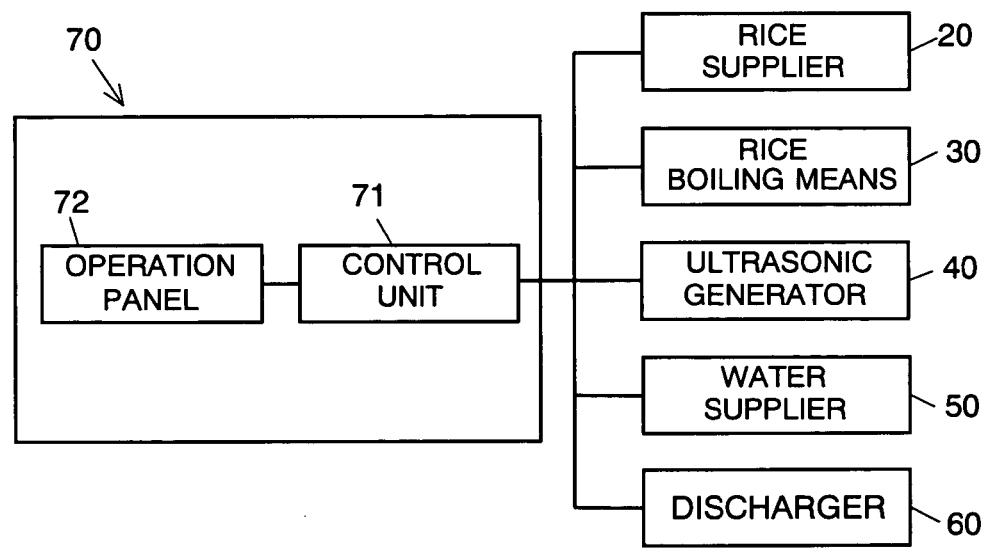
FIG. 6 is a block diagram showing a relationship between the controller and each other means.

When bringing out the boiled rice, the operator operates the rice cooking unit shift switch of the operation panel 72, so as to send the control unit 71 a rice cooking unit shift signal. Receiving the shift signal, the control unit 71 first sends to the extension shaft 38 a contraction signal. By contraction of the extension shaft 38, the lid 34 is raised and then stopped at a predetermined upper limit position. Receiving a signal indicating that the lid has been stopped, the control unit 71 then sends the slide table driver 37 a signal for moving the slide table 35 forward. Receiving the signal, the slide table driver 37 moves forward the slide table 35 mounted with the rice cooker main body 31 and then stops it at a predetermined position. Thereby, the rice cooker main body 31 is pulled out to the front side of the rice cooking apparatus 10, as shown in FIG. 5, so that the boiled rice can be brought out.

After bringing out the boiled rice, the operator operates the rice cooking unit shift switch of the operation panel 72 again, so as to send a signal for moving the slide table 35 backward from the control unit 71 to the slide table driver 37. In response to that, the slide table 35 is moved backward and then stopped at a predetermined position. Receiving a signal indicating that the slide table 35 has been stopped, the control unit 71 sends an extension signal to the extension shaft 38, so that the lid 34 is lowered to close the rice cooker main body 31. Thus, the step for housing the rice cooker is finished.

When washing the rice kettle 32 after bringing all of the boiled rice out, the operator first operates the rice kettle washing switch of the operation panel 72, so as to send the control unit 71 a start signal for the rice kettle washing. Receiving the start signal, the control unit 71 sends a signal to the extension shaft 38 and the slide arm 39b, as described above. In response to that, the lid 34 is moved upward as well as backward and then stopped at a predetermined rear position. Receiving a signal indicating that the lid 34 has been stopped, the control unit 71 then opens the electromagnetic valve 55 for a specific period of time, so as to supply water into the rice kettle 32 to a full water level. Receiving a signal indicating that the water supply has been completed, the control unit 71 moves the lid 34 forward and downward to close the rice cooker. When the lid 34 stops moving downward, the control unit 71 sends a signal to the inverter. The inverter supplies high-frequency power to the ultrasonic transducers 41. The ultrasonic transducers 41 change the power supplied by the inverter into ultrasonic waves, so as to give ultrasonic vibration to the water and leftover rice within the rice kettle 32. Thus, the leftover rice adherent to the rice kettle 32 and the lid 34 is separated, so that it comes to float or settle down in the water.

After a preset period of time, the ultrasonic transducers 41 finish the washing work, and a signal indicating that the washing has been finished is sent to the control unit 71. In response to that, the control unit 71 raises the lid 34 again and then put it on standby at the rear position. Receiving a signal indicating that the lid 34 has been stopped, the control unit 71 then sends the suction pipe driver 62 a signal for lowering the suction pipe. In response to that, the suction pipe driver 62 lowers the suction pipe 61 to the inside of the rice kettle 32 and then stops it at a predetermined position. The suction port 66 is positioned at a level above the lower limit position so as to easily suck in the leftover rice contained in the washing water. Receiving a signal indicating that the suction pipe 61 has been stopped, the control unit 71 drives the pump 64 and discharges the water containing the leftover rice. For adequately washing the rice kettle, a series of the steps including the ultrasonic washing and the water discharge are repeated a preset number of times, while the suction pipe 61 is lowered gradually. At the stage of draining the water within the rice kettle 32 after the final washing, the suction port 66 is close to the bottom of the rice kettle 32, so that the remaining water is minimized.

After the rice kettle washing operation is performed a preset number of times, a signal indicating that the water discharge has been finished is sent to the control unit 71. In response to that, the control unit 71 moves the suction pipe 61 upward and stops it at a predetermined position. Receiving a signal indicating that the suction pipe 61 has been stopped, the control unit 71 sends the heater 33 a heating signal for a preset period of time, so as to dry the rice kettle 32. After the preset period of time, the control unit 71 finishes the step of drying the rice kettle by stopping sending the heating signal. Then, the control unit 71 lowers the lid 34 to close the rice cooker main body 31.

According to the above, the full automatic rice cooking apparatus of the present embodiment finishes all of the steps from the rice measuring to the rice boiling and then the rice kettle washing.

As described above, the rice cooking apparatus of the present embodiment automatically performs the washing of the rice kettle after use in addition to the respective steps required for completing the rice cooking, so that it can produce a significant laborsaving in the rice cooking. By adopting such a construction where the washing means serves as the rinsing means, it is possible to reduce the number of parts, lower the manufacturing costs and downsize the apparatus. Since the rice cooking apparatus of the possible to automatically switch between the above steps with no need of manual work. Therefore, a further laborsaving can be attained.

Since a plurality of the ultrasonic transducers 41 equally arranged around the periphery of the rice kettle are used as the ultrasonic generator 40 for the rice rinsing and the rice kettle washing, the rice and water within the rice kettle or the leftover rice adherent to the rice kettle is equally given ultrasonic vibration. Therefore, an adequate rinsing/washing effect can be obtained. In the rice cooking apparatus of the present embodiment, each part of the apparatus includes a detector for detecting completion of each operation and sending a signal to the control unit. The control unit receives a signal indicating that the operation has been completed, and then outputs a signal starting the next operation. However, it is possible to adopt such a construction where the above detector is not provided. In this case, when the control unit finishes the instruction of the predetermined operation or when a preset period of time passes since the operation is started, the control unit automatically outputs a signal starting the next operation

The invention claimed is:

1. An automatic rice cooking apparatus provided with a water supplier for supplying water into a rice kettle placed at a predetermined position and a discharger for discharging water supplied into the rice kettle to the outside of the rice kettle, where a rice supplier supplies a predetermined amount of rice into the rice kettle and then a rice boiling means boils the rice, the automatic rice cooking apparatus comprising:

a rice kettle washing means for washing an inner wall of the rice kettle placed at the predetermined position after the rice boiling, the rice kettle washing means having an ultrasonic generator propagating ultrasonic waves to water supplied into the rice kettle; and a controller for controlling the water supplier, the discharger, the rice supplier, the rice boiling means, and the rice kettle washing means.

2. The automatic rice cooking apparatus according to claim 1, wherein the apparatus further comprises a rice rinsing means and the controller operates control so that the rinsing means rinses rice supplied into the rice kettle by the rice supplier and then the rice boiling means boils the rice.

3. The automatic rice cooking apparatus according to claim 2, wherein the controller operates a control whereby the rice rinsing by the rice rinsing means is not performed, according to a setting.

4. The automatic rice cooking apparatus according to claim 1, wherein the ultrasonic generator has a plurality of ultrasonic transducers equally arranged around a periphery of the rice kettle.

5. The automatic rice cooking apparatus according to claim 4, wherein the discharger has a suction port vertically movable to a lower limit position above an inner bottom surface of the rice kettle by a predetermined distance.

6. The automatic rice cooking apparatus according to claim 1, wherein the rice kettle washing means serves as the rice rinsing means, and the water supplier and the discharger are in common use for the rice rinsing and the rice kettle washing.

7. The automatic rice cooking apparatus according to claim 1, wherein the discharger has a suction port vertically movable to a lower limit position above an inner bottom surface of the rice kettle by a predetermined distance.

8. The automatic rice cooking apparatus according to claim 7, wherein the controller controls the discharger so that the suction port is stopped above the lower limit position when the rice kettle washing is started and then lowered gradually to reach the lower limit position when the rice kettle washing is completed.

9. The automatic rice cooking apparatus according to claim 1, wherein the ultrasonic generator is attached to the rice kettle so that a surface of the ultrasonic generator for ultrasonic generation contacts an outer surface of the rice kettle, and is configured to directly vibrate leftover rice attached to the inner wall of the rice kettle.

10. The automatic rice cooking apparatus according to claim 9, wherein the controller is configured to operate the ultrasonic generator in a first mode for rinsing rice to be cooked and in a second mode for separating leftover rice attached to the inner wall of the rice kettle.

11. The automatic rice cooking apparatus according to claim 1, wherein the controller is configured to operate the ultrasonic generator in a first mode for rinsing rice to be cooked and in a second mode for separating leftover rice attached to the inner wall of the rice kettle.

* * * * *